United States Patent
Zappelli et al.

(10) Patent No.: US 6,238,635 B1
(45) Date of Patent: May 29, 2001

(54) CATALYTIC PROCESS FOR THE DECOMPOSITION OF ORGANIC POLLUTANTS

(75) Inventors: Piergiorgio Zappelli, Via Adda; Alberto David, Via della Costituzione; Francesca Polla Mattiot, Lungotevere delle Armi; Lucio De Angelis, Viale S.G. Bosco, all of (IT)

(73) Assignee: Enitecnologie S.p.A., San Donato Milanese (IT)

( * ) Notice: Subject to any disclaimer, the term of this patent is extended or adjusted under 35 U.S.C. 154(b) by 0 days.

(21) Appl. No.: 09/346,997

(22) Filed: Jul. 2, 1999

(30) Foreign Application Priority Data

Sep. 16, 1998 (IT) .............................. MI98A2007

(51) Int. Cl.[7] ..................................... A62D 3/00
(52) U.S. Cl. ..................... 423/240 S; 588/206; 588/207; 588/227; 204/157.3; 204/158.2
(58) Field of Search ................. 423/240 S; 588/206, 588/207, 227; 204/157.3, 157.15, 158.2

(56) References Cited

U.S. PATENT DOCUMENTS 4,935,114  6/1990  Varma .
4,966,665  10/1990  Ibusuki et al. .
5,417,825  5/1995  Graham et al. .
5,449,443 * 9/1995  Jacoby et al. ................. 204/157.3
5,650,549  7/1997  Dellinger et al. .

FOREIGN PATENT DOCUMENTS

WO 94/19090    9/1994  (WO) .

OTHER PUBLICATIONS

Kirk–Othmer, Encyclopedia of Chemical Technology, 1996, "Photochemical Technology (Photocatalysis)", pp. 826–830.*

Derwent Abstracts, AN 1989–203944, JP 01 143630, Jun. 6, 1989.

* cited by examiner

Primary Examiner—Steven P. Griffin
Assistant Examiner—Christina Ildebrando
(74) Attorney, Agent, or Firm—Oblon, Spivak, McClelland, Maier & Neustadt, P.C.

(57) ABSTRACT

Toxic components in a gaseous effluent containing toxic organic, chlorinated and non-chlorinated compounds are degraded by a process, comprising: contacting the gaseous effluent containing toxic components with a semiconductor metal oxide; and heating the gaseous effluent in contact with the semiconductor metal oxide to a temperature ranging from 300 to 600° C. while irradiating the gaseous effluent with ultraviolet light having a wave-length ranging from 180 to 400 nm.

4 Claims, 8 Drawing Sheets

CATALYTIC PROCESS FOR THE DECOMPOSITION OF ORGANIC POLLUTANTS

BACKGROUND OF THE INVENTION

1. Field of the Invention

The present invention relates to a process for the elimination of toxic effluents in gas phase by the combination of a thermal and photocatalytical process.

2. Description of the Background

High temperature thermodestruction processes and, more rarely, technologies based on ultraviolet radiation, with or without catalysts, and plasma processes are used for the separation of gas or gas-transportable polluting agents.

The property of $TiO_2$ of catalysing, by means of UV reaction, the oxidation of organic compounds, has been used in numerous applications, in liquid phase and in gas phase. Literature in this respect describes a non-specific oxidative process. Research interest however is concentrated towards groups of hydrocarbons and halogenated compounds, owing to the great importance the diffusion of these compounds has for the health of man and the environment. In processes in gaseous phase the catalyst is both immobilised on the carrier and fluidized by the gaseous stream. This technology however has limits as in most cases the degrading effect on the pollutants, in particular chlorinated pollutants, does not reach mineralization, but stops at intermediates, sometimes toxic, of the starting product.

For the elimination of toxic organic compounds, of the polychlorinated type and dioxins, the association of a thermal process at 600–800° C. with a photochemical process, by means of radiation from 185 to 290 nm, has been proposed (U.S. Pat. No. 5,417,825). It has now been surprisingly found that, by operating under blander conditions with respect to both temperature and radiation, substances in gaseous phase can be effectively degraded by the association of thermal energy and photochemical energy in the presence of a suitable catalyst.

SUMMARY OF THE INVENTION

In accordance with this, the present invention relates to a process for the degradation of toxic effluents in gas phase containing organic, chlorinated and non-chlorinated compounds, comprising:

putting the toxic effluents in contact with semiconductor metal oxides;

heating these effluents and metal oxides to a temperature ranging from 300 to 600° C. and irradiating with ultraviolet light having an emission spectrum ranging from 180 to 400 nm.

The semiconductor oxide which, under preferred conditions, is titanium oxide can also be, for example, tin oxide.

For illustrative purposes of the invention, in a typical embodiment for the heating of the gaseous mixture and support of the catalyst oxide, a 10×25 mm alumina plate is used, on which a resistive paste is deposited by serigraph. In this way, a resistor is obtained, which is capable of uniformly heating to the desired temperature, the metal oxide deposited on the other side of the plate. The heating can naturally be carried out using any other known method of the art. The plate is inserted into an appropriate reactor, equipped with a window made of quartz or other material useful for the passage of ultraviolet radiation in which the gaseous effluent containing pollutants is immersed. The deposition of the catalyst can be obtained in various ways which are known in the art, such as for example: the sol-gel technique, serigraph, direct adhesion starting from an aqueous suspension followed by drying, dry application of the catalyst in powder form using a ceramic glue.

The ultraviolet illumination is obtained with a mercury lamp or any source of the commercial type capable of supplying light within the range of 180–400 nm.

Figure 1:
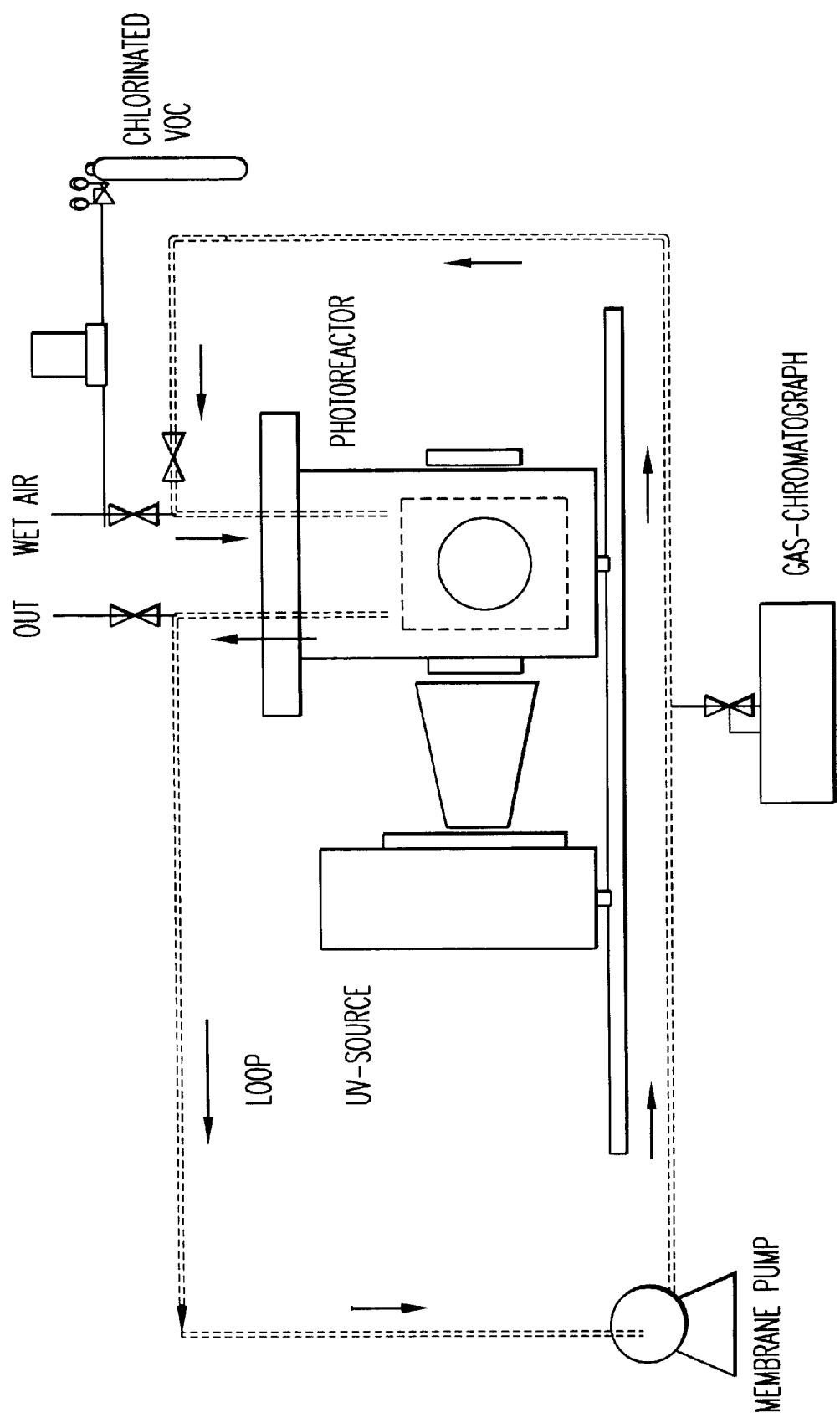
FIG. 1 shows an apparatus embodiment for conducting the process of the invention.

FIG. 1 illustrates with a block scheme a possible instrumentation for the embodiment of the process of the present invention.

With the process of the present invention, a degradation capacity is obtained which is higher than that of the traditional photocatalytic system. At the same time a thermal process is used which takes place at decisively lower temperatures than those of thermodestruction processes. With respect to photodegradation processes, it also uses radiation with lower energy.

The following examples provide a better understanding of the invention but do not limit its scope in any way.

Figure 2:
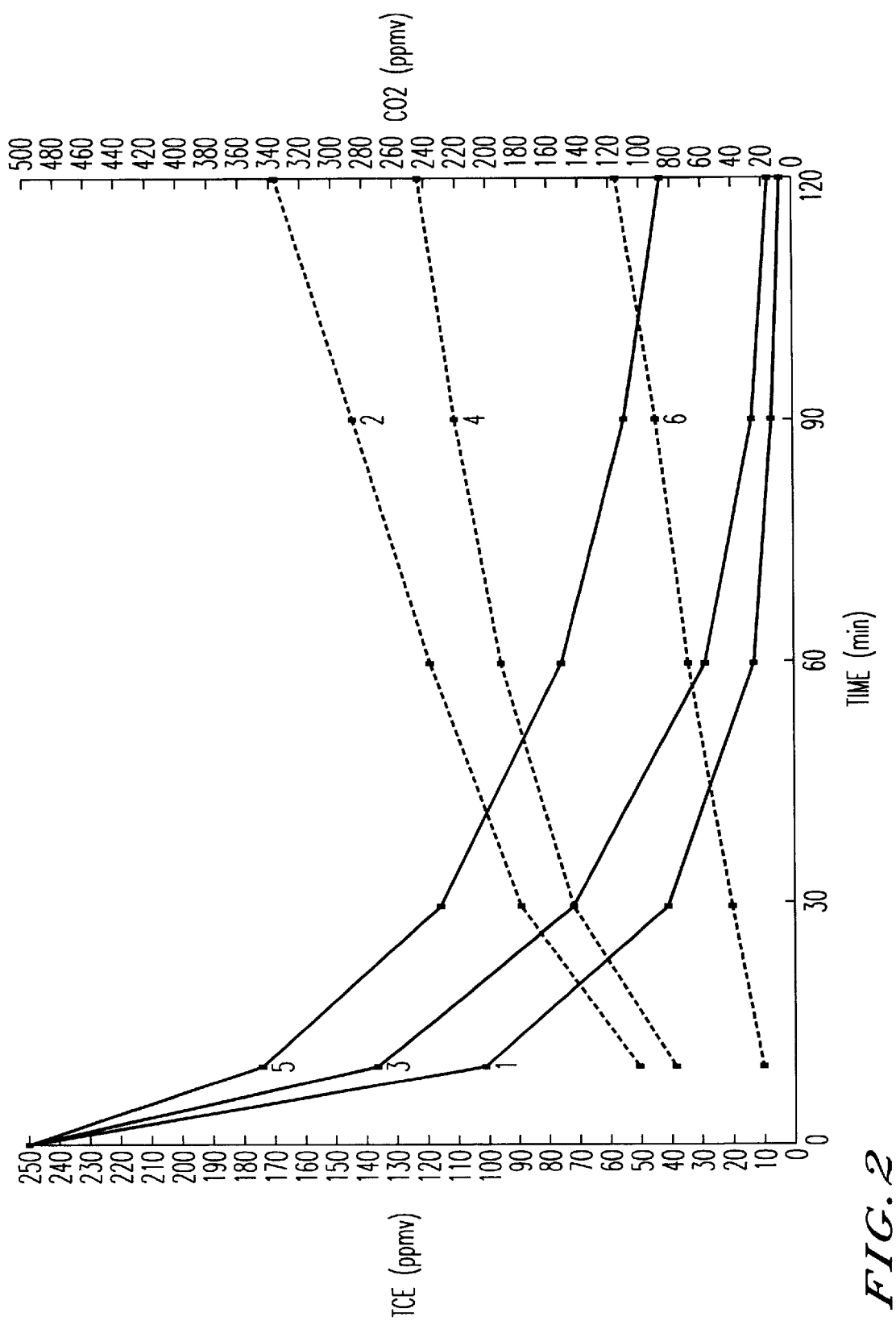
FIG. 2 graphically illustrates the results of the degradation of trichloroethylene by the present process.

Table 1 indicates the data of various comparative experiments obtained on the degradation of trichloroethylene (TCE). FIG. 2 graphically illustrates the decomposition curves of TCE, used as model polluting compound, under various experimentation conditions. The lamp used had a radiant energy of $7 \times 10^3$ W/m$^2$.

The curves which represent the reduction in the concentration of TCE over a period of time, clearly demonstrate the greater effectiveness of the thermophotocatalytic system (curve 1) proposed herein (82% conversion at 30 minutes) with respect to the classical photocatalytic system (curve 5) (49% conversion at 30 minutes). The greater effectiveness of the thermophotocatalytic system of the present invention is also evident from an examination of the transformation of the pollutant into $CO_2$ (mineralization). After 120 minutes of treatment the thermophotocatalytic system shows a yield to $CO_2$ of 77% (curve 2), against 26% of the photocatalytic system (curve 6).

The trend of the thermocatalytic system is also indicated for comparison. The latter shows an intermediate activity (curves 3 and 4) between the thermophotocatalytic and photocatalytic systems, thus confirming the addition of the two energy supplies for the degradation of the pollutants. The details of the three experiments are provided in examples 1, 7, 8.

Figure 3:
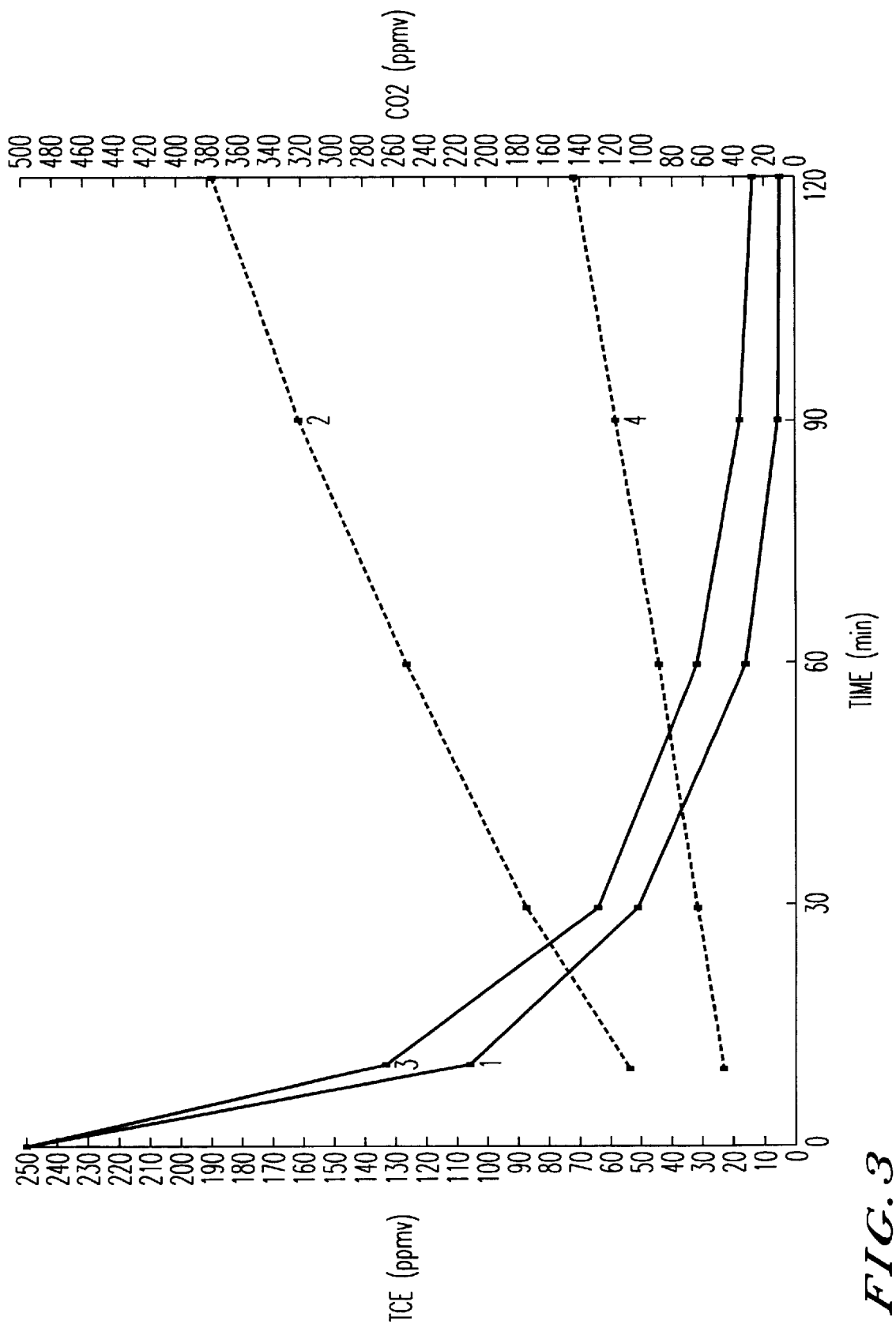
FIG. 3 graphically illustrates the comparative results of the degradation of trichloroethylene and the formation of $CO_2$ by a thermophotocatalytic process and by photocatalysis.

FIG. 3 indicates the degradation curves of TCE and the formation curves of $CO_2$ relating to the comparison between thermophotocatalysis (curves 1 and 2) and photocatalysis (curves 3 and 4), effected under identical conditions to the previous ones but with radiant energy of $1.8 \times 10^3$ W/m$^2$. The details of the experiment are indicated in example 2.

Figure 4:
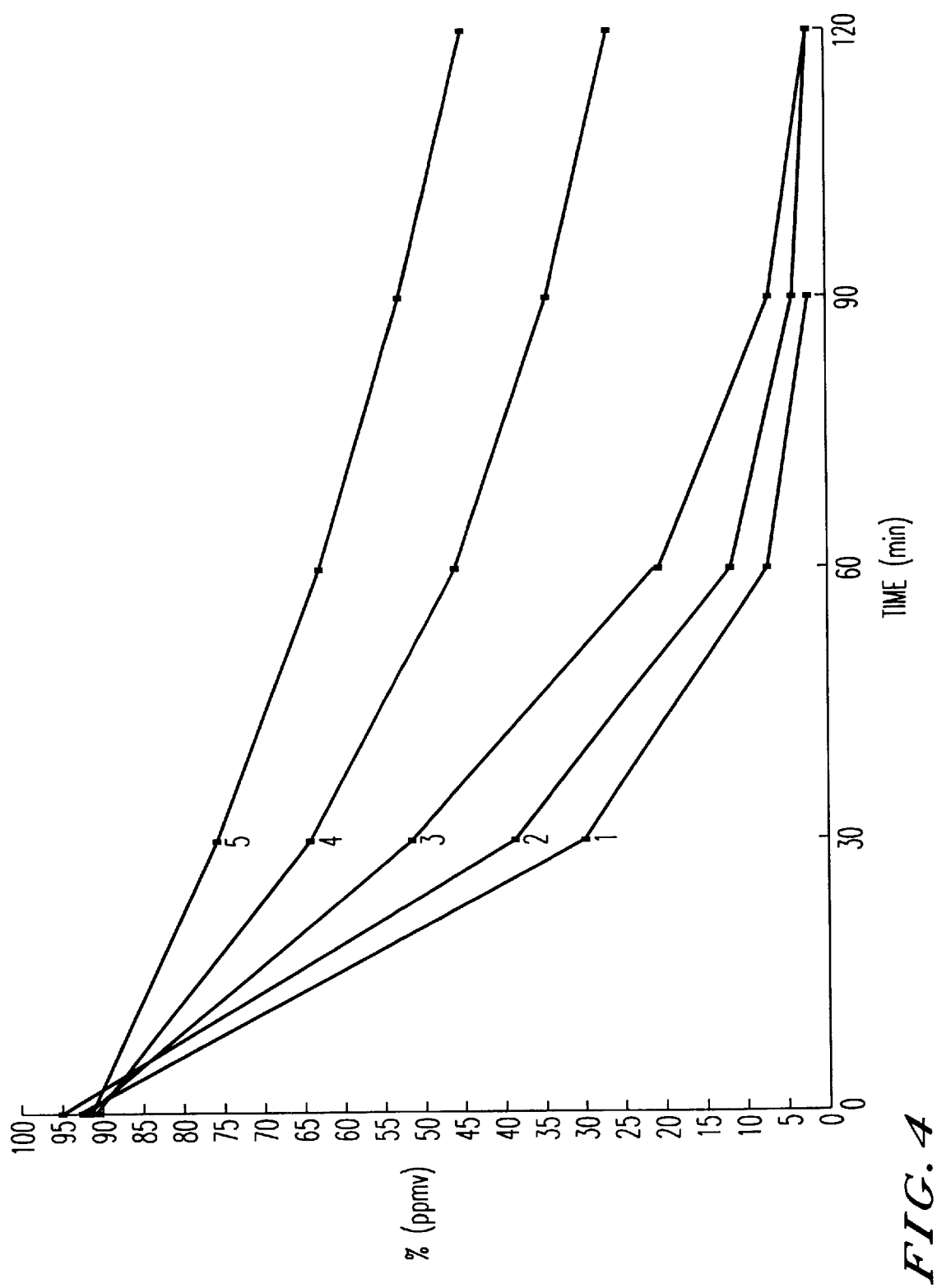
FIG. 4 graphically shows the degradation curves of trichloroethylene by thermophotocatalysis.

FIG. 4 indicates the degradation curves of TCE by thermophotocatalysis with variations in the concentration. The concentrations of TCE subjected to the experiment expressed in ppm were: 67 (curve 1), 125 (curve 2), 254 (curve 3), 487 (curve 4), 921 (curve 5). The details of the experiment are provided in example 3.

Figure 5:
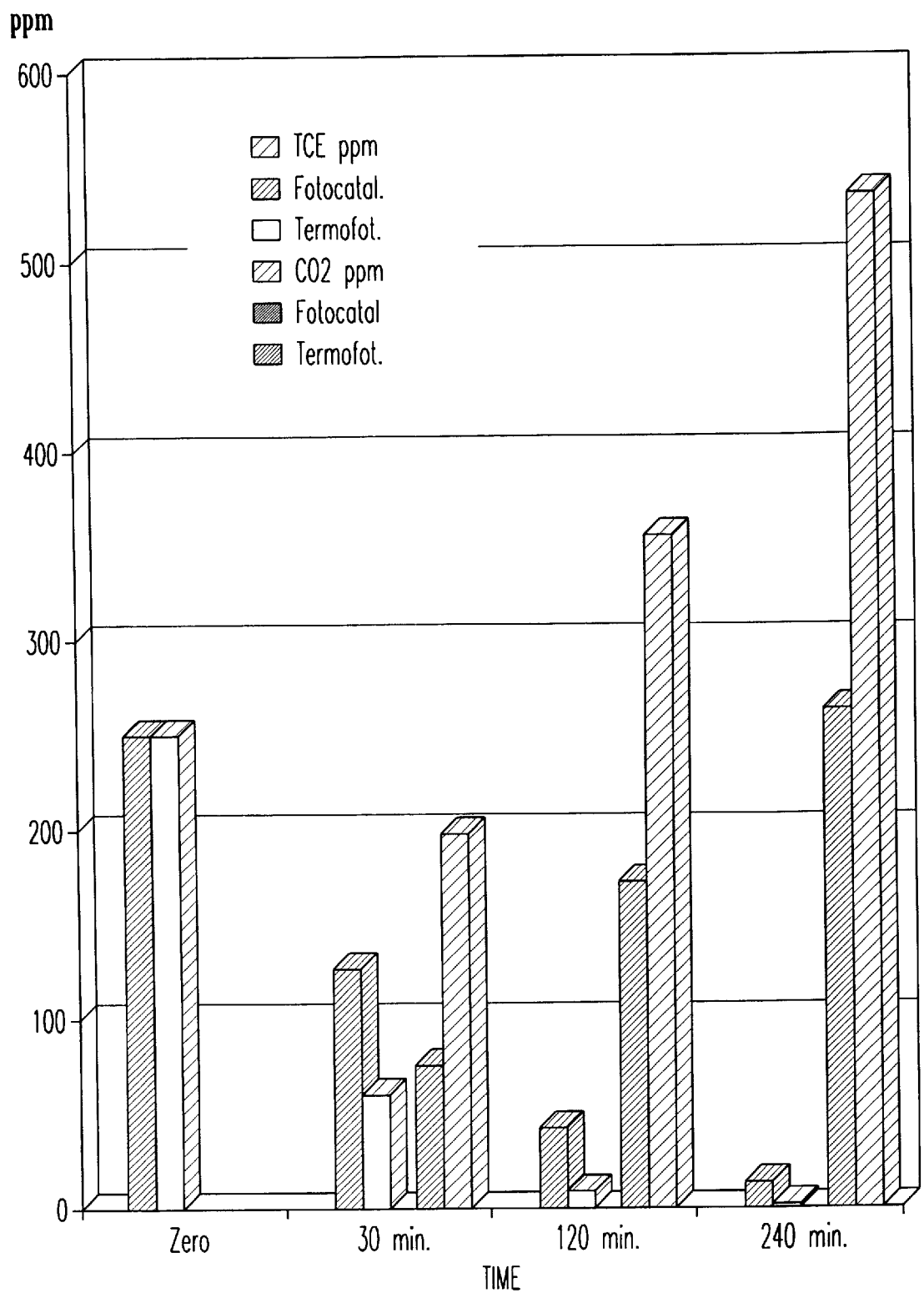
FIG. 5 graphically shows the comparative degradative capacity of trichloroethylene by thermophotocatalysis and by photocatalysis.

FIG. 5 gives a graphic representation of the degradative capacity of TCE obtained with the thermophotocatalysis technique compared with the photocatalysis technique. The data refer to experiments in which the same concentration of TCE (250 ppm) is degraded with the two techniques, measuring over a period of time the concentration of residual TCE and that of the $CO_2$ formed. The comparison reproduced in the bar graph demonstrates the advantage in using thermophotocatalysis with respect to photocatalysis.

Table 2 provides the data of various comparative experiments in the degradation of chlorobenzene: Thermophotocatalysis (TPC), Photocatalysis (PC), Thermocatalysis (TC). The values given in the table indicate, for each time examined, the quantity of chlorobenzene eliminated (its percentage in brackets) and the quantity of $CO_2$ produced (in brackets its percentage with respect to the theoretical value).

Figure 6:
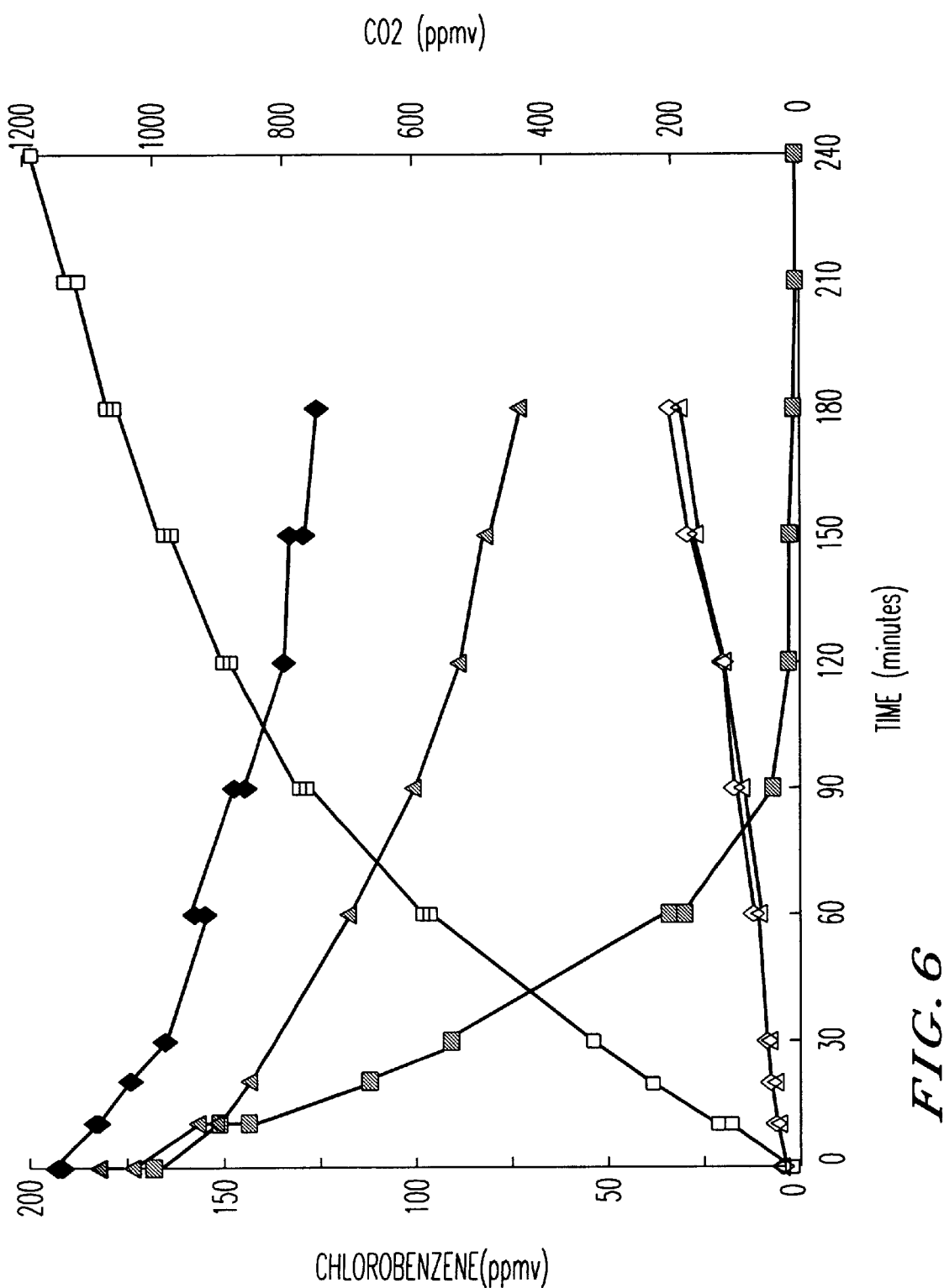
FIG. 6 shows the comparative results of the degradation of chlorobenzene and the formation of $CO_2$ by a thermophotocatalytic process and by photocatalysis.

FIG. 6 provides the degradation curves of chlorobenzene and the formation curves of $CO_2$ under the thermophotocatalysis operating condition (TPC, square), compared with the photocatalysis curves (PC, triangle) and thermocatalysis curves (TC, rhombus). The greater effectiveness of the thermophotocatalytic system with respect to the photocatalytic system is evident: after 60' of reaction under TPC conditions the chlorobenzene has an 81% conversion, whereas under PC conditions the conversion stops at 36%. An even greater difference between the two techniques in favour of TPC is evidenced from analysis of the $CO_2$ produced: after 180' of reaction with TPC 98% of the theoretical $CO_2$ is produced, whereas with PC, only 17% is obtained.

Figure 7:
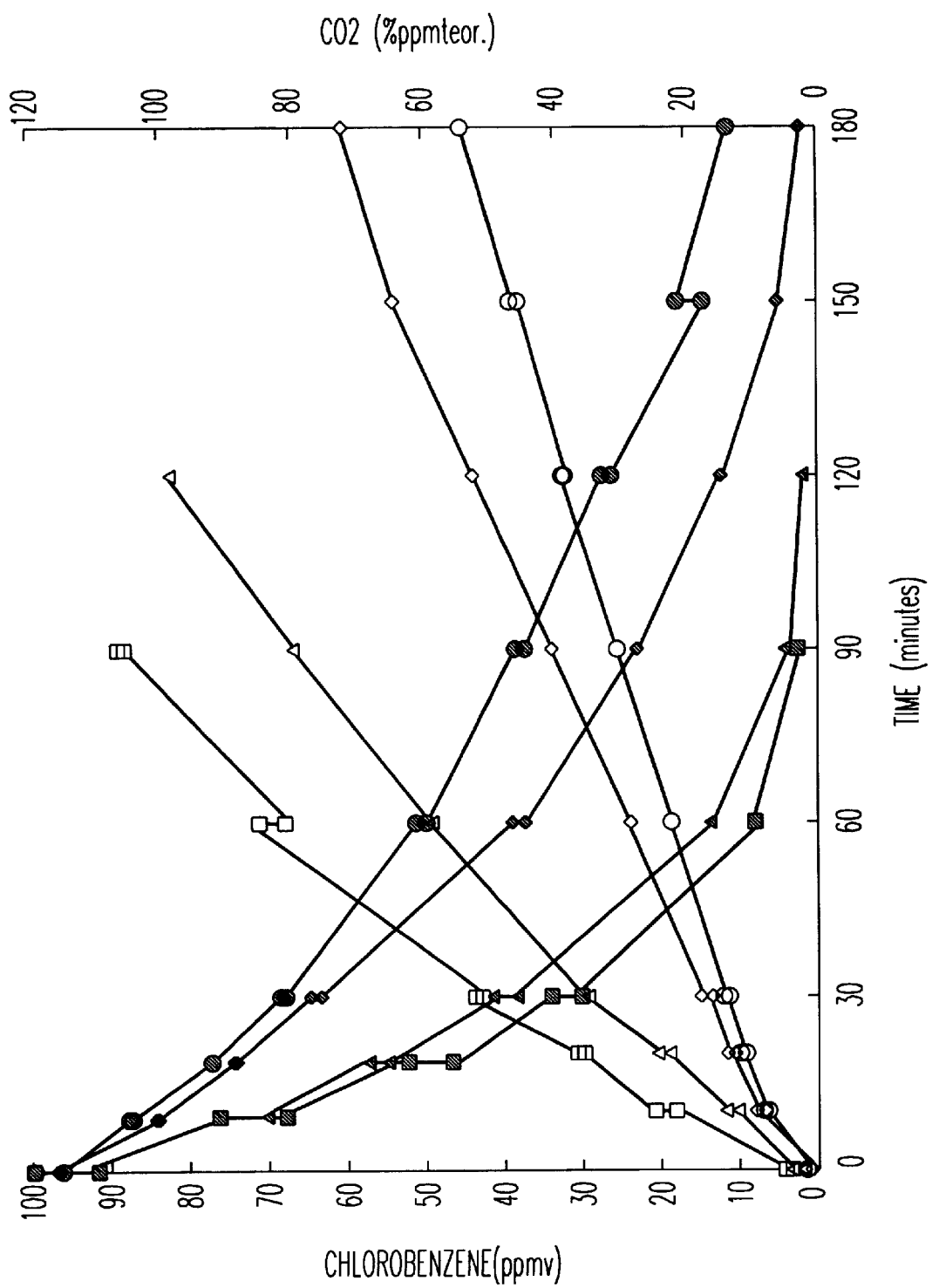
FIG. 7 shows the comparative results of the degradation of chlorobenzene and the formation of $CO_2$ by thermophotocatalytic conditions at different concentrations.

FIG. 7 shows the degradation curves of chlorobenzene and those of $CO_2$ formation under thermophotocatalytic conditions, operating at different concentrations expressed in ppm: 33 (square), 54 (triangle), 154 (rhombus), 224 (circle).

Figure 8:
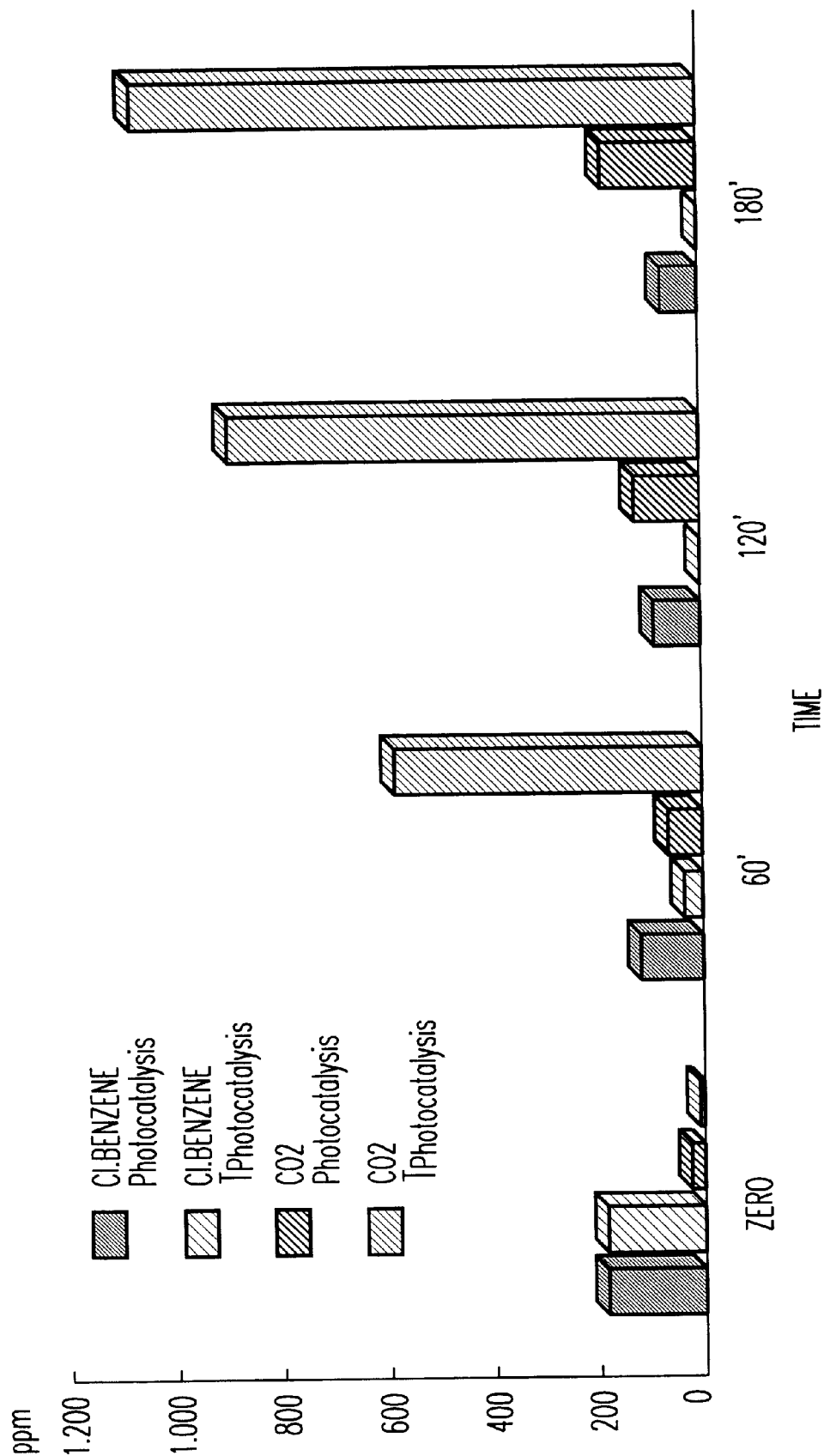
FIG. 8 provides a graphic representation of the degradative capacity of chlorobenzene by thermophotocatalytic and by photocatalytic techniques.

FIG. 8 provides a graphic representation of the degradation capacity of the chlorobenzene obtained with the thermophotocatalytic and photocatalytic techniques. From a comparison, the greater degradation efficiency provided by the thermophotocatalytic technology with respect to the photocatalytic technique is evident. Of particular environmental importance is the dramatic difference in the formation of $CO_2$ illustrated by the two technologies. In fact an indication of an effective decontamination process does not lie in the simple disappearance of the pollutant, which could hide the formation of intermediates which are potentially just as toxic, but in its mineralization, revealed by the production of a stoichiometric quantity of $CO_2$ with its carbon content.

EXAMPLE 1

Thermophotocatalytic Treatment of Trichloroethylene

An electrically heatable alumina plate (10×25 mm), on which $TiO_2$ (surface covered 1 cm$^2$) has been deposited, is inserted into a steel reactor having a volume of 300 ml, equipped with a quartz window. The plate is positioned in such a way as to be irradiated by a mercury vapour UV lamp, equipped with a projector capable of concentrating the ray emitted onto the target. After flushing the reactor with humidified air (11% relative humidity) the reactor is connected to a closed circuit pump and a calibrated mixture of trichloroethylene (TCE) in air is then introduced, so that the concentration of TCE in the reactor is 250 ppm. The reactor is connected to a gas chromatograph equipped with an automatic valve with timed sampling at intervals of 30 minutes and a double analytical system consisting of two columns and two detectors to allow the contemporary monitoring of the disappearance of TCE and formation of $CO_2$. The reaction mixture is circulated for 30 minutes, after which both the heating and the UV lamp are switched on (radiant energy $7 \times 10^3$ W/m$^2$), the temperature of the plate being brought to 450° C. The concentration of TCE decreases to 40 ppm after 30 minutes (82% conversion) reaching 3 ppm after 120 minutes (99% conversion). Contemporaneously the $CO_2$ reaches 347 ppm after 120 minutes (77% yield).

EXAMPLE 2

Operating as described in Example 1, but reducing the radiant energy from $7 \times 10^3$ W/m$^2$ to $1.8 \times 10^3$ W/m$^2$, positive results were still obtained for thermophotocatalysis (FIG. 3). In fact, although the trend difference between the degradation curves of TCE for thermophotocatalysis, with respect to photocatalysis, is reduced, the mineralization of the pollutant is distinctly favoured in the case of thermophotocatalysis, as shown by the $CO_2$ formation curves. After 120 minutes of reaction, whereas thermophotocatalysis produces 377 ppm of $CO_2$ (84% yield), photocatalysis produces 142 ppm (32% yield).

EXAMPLE 3

Efficiency Tests of the Thermophotocatalytic System in the Decomposition of TCE at Different Concentrations Using the equipment and methods described in Example 1, experiments are carried out varying the concentration of TCE. The following concentrations of TCE are subjected to degradation in sequence in the reactor: 67 ppm, 126 ppm, 254 ppm, 487 ppm, 921 ppm. The reactor is connected to a gas chromatograph equipped with an automatic valve with timed sampling at intervals of 30 minutes. The reaction mixture is circulated for 30 minutes, after which both the heating and UV lamp are switched on, the temperature of the plate being brought to 450° C. The degradation rate of TCE in relation to the concentration is indicated in FIG. 4.

EXAMPLE 4

Comparative Example

Conservation (Stability) Test of the Chlorinated Compound in the Reactor

An alumina plate without titanium oxide is inserted into a steel reactor as described in Example 1. After flushing the reactor with humidified air (relative humidity 11%), the reactor is connected to a closed circuit pump and a mixture of trichloroethylene (TCE) in air is then introduced with a syringe, so that the concentration of TCE in the reactor is 250 ppm. The reactor is connected to a gas chromatograph equipped with an automatic valve with timed sampling, at intervals of 30 minutes. After 120 minutes the concentration measured in the reactor was 225 ppm.

EXAMPLE 5

Comparative Example

Thermal Treatment

An alumina plate equipped with an electric heating device is inserted into a steel reactor as described in Example 1. After flushing the reactor with humidified air (relative humidity 11%), the reactor is connected to a closed circuit pump and a mixture of trichloroethylene (TCE) in air is then introduced with a syringe, so that the concentration of TCE in the reactor is 250 ppm. The reactor is connected to a gas chromatograph equipped with an automatic valve with timed sampling, at intervals of 30 minutes. The reaction mixture is circulated for 60 minutes, after which the heating is switched on and the target plate is brought to a temperature of 450° C. No particular variations are noted in the concentration of TCE which can be attributed to the heating and after 120 minutes the TCE remaining in the reactor is the same as that specified in Example 4 (without heating).

EXAMPLE 6

Comparative Example
Photolytic Treatment

An alumina plate without titanium oxide is inserted into a steel reactor as described in Example 1. The plate is positioned in such a way as to be irradiated by a mercury vapour UV lamp, equipped with a projector capable of concentrating the ray emitted onto the target. After flushing the reactor with humidified air (11% relative humidity) the reactor is connected to a closed circuit pump and a mixture of trichloroethylene (TCE) in air is then introduced with a syringe, so that the concentration of TCE in the reactor is 250 ppm. The reactor is connected to a gas chromatograph equipped with an automatic valve with timed sampling at intervals of 30 minutes. The reaction mixture is circulated for 30 minutes, after which the UV lamp is switched on. The concentration of TCE revealed by GC shows, over a period of time, a trend similar to that observed in Examples 4 and 5.

EXAMPLE 7

Comparative Example
Photocatalytic Treatment

An alumina plate (10×25 mm) onto which $TiO_2$ has been deposited (surface covered 1 $cm^2$) is inserted into a steel reactor as described in Example 1. The plate is positioned in such a way as to be irradiated by a mercury vapour UV lamp, equipped with a projector capable of concentrating the ray emitted onto the target. After flushing the reactor with humidified air (11% relative humidity) the reactor is connected to a closed circuit pump and a mixture of trichloroethylene (TCE) in air is then introduced with a syringe, so that the concentration of TCE in the reactor is 250 ppm. The reactor is connected to a gas chromatograph equipped with an automatic valve with timed sampling at intervals of 30 minutes. The reaction mixture is circulated for 30 minutes, after which the UV lamp is switched on. The concentration of TCE revealed by GC decreases 30 minutes after the lamp is switched on to 115 ppm (49% conversion) and after 120 minutes to 43 ppm (81% conversion). At the same time the $CO_2$ formed at 120 minutes is 115 ppm (26% yield).

EXAMPLE 8

Comparative Example
Thermocatalytic Treatment

An alumina plate (10×25 mm) with electric heating, onto which $TiO_2$ has been deposited, is inserted into a steel reactor as described in Example 1. After flushing the reactor with humidified air (11% relative humidity) the reactor is connected to a closed circuit pump and a mixture of trichloroethylene (TCE) in air is then introduced with a syringe, so that the concentration of TCE in the reactor is 250 ppm. The reactor is connected to a gas chromatograph equipped with an automatic valve with timed sampling at intervals of 30 minutes. The reaction mixture is circulated for 30 minutes, after which the heating is switched on, the temperature of the plate being brought to 450° C. The concentration of TCE decreases to 71 ppm after 30 minutes (68% conversion) reaching 7 ppm after 120 minutes (97% conversion). The $CO_2$ formed after 120 minutes amounts to 243 ppm (54% yield).

EXAMPLE 9

Thermophotocatalytic Treatment of Chlorobenzene

A mixture of chlorobenzene in air is introduced into a steel reactor as described in Example 1, so that the concentration of chlorobenzene in the reactor is 178 ppm. Operating analogously to what is described in Example 1, timed samples are taken of the reaction mixture and both the concentration of residual chlorobenzene and that of the $CO_2$ formed are determined by gas chromatography. The concentration of chlorobenzene decreases to 34 ppm after 60' (81% conversion), reaching 3 ppm after 180' (99% conversion). Contemporaneously the $CO_2$ produced reaches 1063 ppm after 180' of reaction (98% conversion).

EXAMPLE 10

Efficiency tests of the thermophotocatalytic system in the decomposition of chlorobenzene at different concentrations.

Using the equipment and methods described in Example 9, experiments are carried out varying the concentration of chlorobenzene in the reactor. The following concentrations of chlorobenzene are subjected to degradation in sequence: 33 ppm, 54 ppm, 154 ppm, 224 ppm. The concentration of residual chlorobenzene and that of the $CO_2$ formed during the thermophotocatalytic treatment are determined by gas chromatographic analysis of the different reaction mixtures. The results of the test are indicated in FIG. 8.

EXAMPLE 11

Chlorobenzene—Comparative Example
Photocatalytic Treatment

Operating analogously to what is described in Example 7, 183 ppm of chlorobenzene are introduced into the reactor. Gas chromatographic analysis of the reaction mixture indicates after 60' of treatment a residual concentration of chlorobenzene of 117 ppm (36% conversion) a value which decreases after 180' to 74 ppm (60% conversion). The $CO_2$ produced with this system after 180' of reaction is 184 ppm (17% conversion).

EXAMPLE 12

Chlorobenzene—Comparative Example
Thermocatalytic Treatment

Operating analogously to what is described in Example 8, 191 ppm of chlorobenzene are introduced into the reactor. Gas chromatographic analysis of the reaction mixture indicates after 60' of treatment a residual concentration of chlorobenzene of 155 ppm (19% conversion) a value which decreases after 180' to 125 ppm (34% conversion). The $CO_2$ produced by the system after 180' of reaction is 198 ppm (17% conversion).

TABLE 1

| | TCE Time zero | 30 min. | 120 min. | Conv. at 30 min. % | CO$_2$ Conv. at 120 min. % | Prod. at 120 min. | Yield at 120 min. % |
|---|---|---|---|---|---|---|---|
| TPC (Ex. 1) | 250 ppm | 41 ppm | 3 ppm | 82 | 99 | 348 ppm | 77 |
| PC (Ex. 7) | 250 ppm | 115 ppm | 43 ppm | 49 | 81 | 115 ppm | 26 |
| TC (Ex. 8) | 250 ppm | 71 ppm | 7 ppm | 68 | 97 | 243 ppm | 54 |
| TPC (Ex. 2) | 250 ppm | 51 ppm | 3 ppm | 77 | 99 | 377 ppm | 84 |
| PC (Ex. 2) | 250 ppm | 64 ppm | 13 ppm | 72 | 94 | 142 ppm | 32 |
| Ref. (Ex. 4) | 250 ppm | | 225 ppm | | | | |

TPC = Thermophotocatalysis
PC = Photocatalysis
TC = Thermocatalysis
Ref. = Reference test (Stability of conditions)

TABLE 2

| Time | Zero | 60' | 120' | 180' |
|---|---|---|---|---|
| Chlorobenzene ppm (conv. %) | | | | |
| PC | 183 | 117 (36) | 89 (51) | 74 (60) |
| TC | 191 | 115 (19) | 134 (30) | 125 (34) |
| TPC | 178 | 34 (81) | 3 (98) | 2 (99) |
| CO$_2$ ppm (conv. %) | | | | |
| PC | 25 (2.3) | 65 (6) | 125 (11) | 184 (17) |
| TC | 22 (2) | 69 (6) | 124 (11) | 198 (17) |
| TPC | 10 (1) | 581 (53) | 890 (82) | 1063 (98) |

What is claimed is:

1. A process for the degradation of toxic components in a gaseous effluent containing organic, chlorinated and non-chlorinated compounds, comprising:

contacting said gaseous effluent containing toxic components with a semiconductor metal oxide; and heating said gaseous effluent in contact with said semiconductor metal oxide to a temperature ranging from 450 to 600° C. while irradiating the gaseous effluent with ultraviolet light having a wave-length ranging from 180 to 400 nm.

2. The process according to claim 1, wherein the temperature of the heating process is 450° C.

3. The process according to claim 1, wherein the semiconductor oxide is titanium oxide or tin oxide.

4. The process according to claim 1, wherein the toxic components of the gaseous effluent are polychlorinated compounds and dioxins.

* * * * *